United States Patent [19]
Johnson et al.

[11] Patent Number: 5,910,521
[45] Date of Patent: Jun. 8, 1999

[54] BENZOXAZINE POLYMER COMPOSITION

[75] Inventors: Calvin K. Johnson, Lockport, Ill.; Jimmy Pingao Chen, Prospect, Ky.

[73] Assignee: Borden Chemical, Inc., Columbus, Ohio

[21] Appl. No.: 09/053,541

[22] Filed: Apr. 1, 1998

[51] Int. Cl.⁶ .................................................... B22C 1/22
[52] U.S. Cl. ........................ 523/145; 523/147; 528/128
[58] Field of Search ................................. 523/145, 147; 528/128

[56] References Cited

U.S. PATENT DOCUMENTS

| Re. 32,745 | 9/1988 | Schreiber . |
|---|---|---|
| 4,053,682 | 10/1977 | Donermeyer . |
| 4,379,866 | 4/1983 | Henry, Jr. et al. . |
| 4,460,717 | 7/1984 | Saeki et al. . |
| 4,482,654 | 11/1984 | Nishikawa et al. . |
| 4,501,864 | 2/1985 | Higginbottom . |
| 4,507,428 | 3/1985 | Higginbottom et al. . |
| 4,557,979 | 12/1985 | Higginbottom et al. . |
| 4,634,758 | 1/1987 | Laitar et al. . |
| 4,714,752 | 12/1987 | Sokalski . |
| 4,719,253 | 1/1988 | Turpin et al. . |
| 5,152,939 | 10/1992 | Ishida . |
| 5,189,079 | 2/1993 | Geoffrey et al. . |
| 5,254,664 | 10/1993 | Narang et al. . |
| 5,266,695 | 11/1993 | Ishida . |
| 5,296,584 | 3/1994 | Walisser . |
| 5,543,516 | 8/1996 | Ishida . |
| 5,616,631 | 4/1997 | Kiuchi et al. . |
| 5,648,404 | 7/1997 | Gerber . |

FOREIGN PATENT DOCUMENTS

| 59202135 | of 0000 | Japan . |
|---|---|---|
| 70025119 | of 0000 | Japan . |
| 7188364 | of 0000 | Japan . |

OTHER PUBLICATIONS

A. Knop, L. Pilato, Springer–Verlag (1985) "Phenolic Resin, Chemistry Applications and Performance" pp. 52,53, 34–35 and 226–227.

*Primary Examiner*—Terressa Mosley
*Attorney, Agent, or Firm*—Michael M. Geoffrey; Kenneth P. Van Wyck

[57] ABSTRACT

There is provided a composition that is the product of mixing and reaction a resole, an alcoholate of an amino triazine, and aldehyde. This composition is useful as a thermosetting resin. This composition is useful as a curative for novolac resins. There is also provided a process for making this composition. In particular there is a process disclosed for making this composition in aqueous solution. Furthermore, curable novolac compositions, and processes for making these compositions, are disclosed and claimed.

28 Claims, No Drawings

5,910,521

BENZOXAZINE POLYMER COMPOSITION

FIELD OF THE INVENTION

This invention relates to a polymer composition produced by combining and reacting a phenolic resole, an alcoholate of an amino triazine, and an aldehyde. This polymer contains a benzoxazine component but may contain other reaction products and unreacted starting materials. For convenience, this polymer composition is hereinafter referred to as a benzoxazine polymer composition. Accordingly, this invention relates to a benzoxazine polymer composition that is useful as a novolac curative and as a thermosetting resin. This composition exhibits reduced emissions of ammonia compared to hexamethylenetetramine, and higher reactivity compared to conventional melamine resin, when used as a novolac curative. Furthermore, the benzoxazine polymer composition exhibits benefits, such as lower activation temperatures and greater reactivity over even recent advances in novolac curatives, such as lower alkoxylated triazine hardeners. As a thermoset resin, the benzoxazine polymer composition may be a low cost alternative to conventional thermoset resins. This invention also relates to the manufacture of the benzoxazine polymer composition from aqueous solution without the use of organic solvents.

BACKGROUND OF THE INVENTION

There is a need for a curative that effectively cures a novolac resin without emitting ammonia during the process. There is a further need for a curative that does not require an extreme elevated temperature to cure a novolac resin. In all cases the curative should provide a state of cure such that the cured novolac resin has useful physical and chemical properties.

Novolacs are thermoplastics that find application in a wide variety of manufactured products. Novolacs bind foundry aggregate or refractory materials. They find use in any number of finished goods, such as brake linings, acoustic insulation, bonded felt, molding compounds, or structural composites.

Generally, because it is thermoplastic, the novolac is cured. It can be the major component of a finished product, as is the case with the general class of thermoplastics. However, the novolac is widely used as the binding matrix of composite materials.

It is well known in the art that the extent of cure the novolac undergoes determines, in part, the quality of the product made with the novolac. The extent of cure determines the thermal resistance, chemical resistance, and structural strength of products made using novolac resins. Generally, these properties will improve as the extent of cure increases. The extent cure increases as the number of reactions between curative and novolac resin increases. Inadequate cure of the novolac will compromise the temperature resistance, chemical resistance, and structural strength of the finished product.

Articles manufactured using a novolac binder typically must offer resistance to the effects of elevated temperatures. If used as a refractory binder, for example, the novolac cannot flow or degrade at the temperatures under which refractory shapes find application. If used as a foundry binder, the novolac must at least resist the temperatures of molten metals long enough for the cast-metal product to take its shape. Similar requirements can exist for other applications where novolacs bind composites such as brake linings or even structural composites. Accordingly, the curative selected must be capable of providing a product that has cured properties such that the product meets these rigorous demands.

Materials manufactured using a novolac binder typically must offer chemical resistance. In refractory applications, for example, the refractory article may be coated with an auxiliary coating designed to increase the refractoriness of the combination. The novolac resin binding the article cannot deteriorate on contact with the coating. The value of the refractory article is lost if the novolac resin deteriorates. Similarly, it is typical that foundry cores and molds have an auxiliary coating applied to improve the refractoriness of the core or mold. It is important that the binder holding the core or mold together resist chemical attack by the coating. Chemical resistance is a requirement of other novolac-bound manufactured articles.

It should be apparent to those skilled in the art that articles manufactured from novolacs or articles made by binding materials with novolacs must also possess structural integrity. Accordingly, the curative selected must be one that allows the manufacture of a product that has the necessary level of structural strength.

As a binder, a novolac coats the other materials that form the finished article. This will sometimes require that the novolac be a liquid at the temperatures of application. Accordingly, at some temperature, the novolac resin must have a viscosity that facilitates the coating of the other materials forming the finished article. Once coated, the article may be shaped and then cured, typically, by using a curative and possibly heat.

Because novolacs typically cure at temperatures above room temperature, the emission of volatile compounds during the curing step can be a concern. The elevated temperatures will increase the emission of volatile compounds.

Several novolac curatives are known in the art. Typically, formaldehyde, hexamethylenetetramine, or a melamine resin convert the novolac to an insoluble infusible condition. Hexamethylenetetramine, or Hexa, or HMTA, is a well known novolac curative. In *Phenolic Resins, Chemistry, Applications and Performance*, (A. Knop and L. A. Pilato, Springer-Verlag (1985)), the authors describe novolac curing as requiring "a crosslinking compound which is mainly HMTA, and rarely paraformaldehyde or trioxane." Where HMTA or formaldehyde cure the novolac resin, emission of volatile reaction products will occur during the cure reaction. When the curative is HMTA, ammonia evolves during curing of the novolac resin. Furthermore, curatives like HMTA typically require curing temperatures as high as 150° C.

While the use of melamine resin as a novolac curative does not result in the release of ammonia during the cure reaction, its use is not without disadvantages. For example, melamine resins typically require either an acid catalyst or elevated temperatures to cure a novolac resin. Also, melamine resin curatives tend to be slower than HMTA and produce a lesser extent of cure.

Liquid alkoxylated melamines or methylolated melamine resins generally require the application of heat, acid catalyst, or both, to effect a reasonable rate of cure. But, melamine curatives do find use and are sold commercially, for example, under the CYMEL trademark (products of Cytec Industries, Inc.), the RESIMINE trademark (products of Monsanto Chemical Co.), and the CASCOMEL trademark (products of Borden Chemical, Inc.). In fact, cross-linking reactions with alkoxylated melamine products may not occur at all without the use of an acid catalyst. See, for example, Cytec Industries product bulletin entitled "Melamine Crosslinking Agents, Performance Property Trends Based on Functional Groups," that describes the general need for an acid catalyst in order to achieve practical cure speeds with melamine curatives. However, some methylolated melamine curatives do not require the application of acid catalysts to effect cure of a novolac, but would require heat.

It is generally known that acids or thermally produced latent acids will lower the curing temperature of novolacs. See, for example, *Phenolic Resins, Chemistry, Applications and Performance*, (A. Knop and L. A. Pilato, Springer-Verlag (1985)), where it is reported that the rate of reaction between HMTA and a novolac increases with decreasing pH. These same acids will also strongly catalyze the cure of melamine resins.

U.S. Pat. No. 5,648,404 to Gerber discloses the use of lower alkoxylated melamine-formaldehyde resin curing agents (triazine hardeners). The disclosure of this patent is incorporated by reference in its entirety. The triazine hardeners of Gerber have a high temperature of activation, and preferably 80% of the cure occurs at 200° C. and above. These curatives find use in application to hot refractory surfaces. The curatives of Gerber are particularly useful in refractory tap-hole applications for blast furnaces. Because of their high temperature of application, these curatives understandably have high temperatures of activation.

Onium salts have been used as curatives for novolac resins. In U.S. Pat. No. 5,254,664, Narang claims onium salts as catalysts to the crosslinking of poly(2-oxazoline) compounds with, for example, aromatic hydroxy compounds such as novolac resins.

Benzoxazine may be an intermediate product in the reaction of HMTA and phenol or substituted phenols. See, for example, *Phenolic Resins, Chemistry, Applications and Performance*, (A. Knop and L. A. Pilato, Springer-Verlag (1985)). However, there is no suggestion that benzoxazine is useful as a curative or even participates in the further reaction of HMTA and phenol or substituted phenols. In fact, is suggested that the crosslinking reaction involves hydrolysis of HMTA, by trace amounts of water in the novolac, thus forming α-aminoalcohols. The α-aminoalcohols are then converted to carbonium ions due to the presence of the acidic phenate. The alcoholates are then free to react with phenol or substituted phenols, via Mannich reaction, to form benzylamine compounds.

Until now, benzoxazines were considered to be poor novolac curatives. There are no known commercial uses of these benzoxazines as novolac curatives. But benzoxazines, as evidenced by the prior art, tended to be synthesized from phenolic compounds that were not polymeric in nature and were never resoles. With few exceptions, generally the prior art discloses the use of phenolic compounds that are small molecules relative to resoles. Higginbottom, in U.S. Pat. No. 4,501,864, describes the synthesis of benzoxazines using polyphenols that are generally simple diols. Higginbottom suggests the use of novolac resins in the synthesis of benzoxazines. However, Higginbottom does not disclose the use of resoles in benzoxazine synthesis. Similarly, Thrane, in U.S. Pat. No. 4,719,253, discloses the use of bisphenol to synthesize benzoxazine. In U.S. Pat. No. 5,543,516 to Ishida, the inventor discloses mono- and di-functional phenols, but polyvinyl phenol is the only reference to a polymeric form of phenol useable in the synthesis of benzoxazine.

There are several until now unanswered needs relating to novolac curatives. A need exists for a curative that will not emit ammonia during the cure reaction while at the same time it neither requires the acid catalysts and/or elevated temperatures of melamine resins nor the extreme elevated temperatures of lower-alkoxylated triazines. A still further need exists for a curative that provides a cure sufficient to provide adequate thermal, chemical, and structural properties, while possessing the advantages of no ammonia emission, broad pH range of application, and conventional temperatures for cure activation.

The benzoxazine polymer composition disclosed herein is also a thermosetting resin. This polymer will undergo homo-condensation at elevated temperatures. It is therefore also useful solely as a thermosetting resin. Such applications include use as a laminating or coating resin, as a binder for refractory materials and foundry aggregate, and as a binder for felt and fiber. Because of its general chemical structure, it is anticipated that the benzoxazine polymer composition disclosed herein will have improved high temperature resistance and chemical resistance as compared to conventional phenolic thermosets.

Benzoxazines have been used as polymerics. Higginbottom, in U.S. Pat. No. 4,501,864, discloses a polymerizable composition comprising a poly(3,4-dihydro-3-substituted-1,3-benzoxazine) and a reactive polyamine or polyamine generating compound, useful as a potting, encapsulating, and laminating resin, and as a surface coating. The dihydrobenzoxazine compound reacts with a polyamine compound to form a cured polymer. Similarly, U.S. Pat. No. 4,719,253, to Thrane, discloses a self-curable composition comprising benzoxazine and a secondary amine. In both references, benzoxazine reacts with an amine to form the cured product and as such are not thermosetting compounds. Benzoxazines also have been used in the preparation of carbon-carbon composites. In U.S. Pat. No. 5,152,939 and U.S. Pat. No. 5,266,695, both to Ishida, the pyrolysis product of multifunctional benzoxazine compounds form the carbon-carbon structure.

Until now, benzoxazines were prepared in solutions of organic solvents or in solventless systems. In U.S. Pat. No. 4,501,864, Higginbottom discloses a process of synthesizing benzoxazine in an organic solvent solution even when aqueous formaldehyde is a reactant. Similarly, Thrane, in U.S. Pat. No. 4,719,253, discloses the use of non-reactive organic solvents even when it is desirable to produce a water dispersible benzoxazine. In U.S. Pat. No. 5,543,516 to Ishida, the inventor uses no solvent, save for the solvency reactants may have for each other, in a method for preparing benzoxazines. Ishida found that water is a distinct disadvantage to many applications employing benzoxazine. Ishida describes the prior art wherein benzoxazine is synthesized in a suitable organic solvent such as dioxan, toluene or alcohol.

OBJECTS OF THE INVENTION

It is one object of the present invention to provide a benzoxazine polymer composition that is the product of combining and reacting an alcoholate of an amino triazine, an aldehyde, and a resole.

It is a further object of the present invention to provide methods of using the disclosed benzoxazine polymer composition as a novolac curative.

It is still a further object of the present invention to provide a process for making a benzoxazine polymer composition that is the product of mixing and reacting an alcoholate of an amino triazine, an aldehyde, and a resole in aqueous solution.

It is yet another object of the present invention to provide a thermosetting resin that is the product of combining and reacting an alcoholate of an amino triazine, an aldehyde, and a resole.

SUMMARY OF THE INVENTION

In one aspect of this invention there is provided a composition that is the product of combining and reacting a methylolmelamine, an aldehyde, and a resole. This composition is useful as a curative for novolac resins and as a thermosetting resin. In another aspect of this invention there is provided a process for making the product in aqueous solution by mixing and reacting methylolmelamine, formaldehyde, and a resole. In yet another aspect of this invention there is provided a composition that is the product of combining and reacting a resole, an alcoholate of an amino triazine, and an aldehyde. It is also an aspect of this invention that the resole and alcoholate of an amino triazine may be formed in situ prior to the process of mixing an reacting a resole, an alcoholate of an amino triazine, and an aldehyde. In yet a further aspect of this invention there is provided curable novolac compositions and a process for making these compositions.

It is not generally true that all benzoxazine compounds and related reaction products are useful as novolac curatives. Benzoxazine is the Mannich product of a phenolic compound, an aldehyde and a primary amine. However, benzoxazine compounds are distinguishable based on the substituents included with either the phenolic moiety, the aldehyde, or the primary amine. In the present invention, the benzoxazine thus formed is the Mannich product of a phenolic component having a —CH group in the benzene ring ortho to the phenolic hydroxyl group, a primary amine component that is an alcoholate of an amino triazine, and an aldehyde.

The composition provided by the present invention when used as a curative offers many advantages over the prior art curatives. Unlike the use of HMTA, when the present invention cures a novolac resin there is effectively no release of ammonia. The composition of the present invention cures novolac resins at conventional curing temperatures, as opposed to the very high temperatures needed with the use of melamine resin in the absence of an acid catalyst. And, unlike the use of alkoxylated melamine hardeners, the curative of the present invention requires only temperatures of activation that are typical of conventional novolac curatives.

DETAILED DESCRIPTION OF THE INVENTION

The benzoxazine polymer composition of this invention may be manufactured by combining an alcoholate of an amino triazine such as melamine, guanamine, benzol guanamine, and related compounds, an aldehyde, and a resole, and allowing these to react under conditions favorable to benzoxazine formation. Examples of alcoholates of amino triazines include methylolmelamine, methylolguanamine, methylolated benzol guanamine and related alcoholates such as ethylolates, propylolates and the like. A general formula for an alcoholate of an amino triazene is given in Formula A.

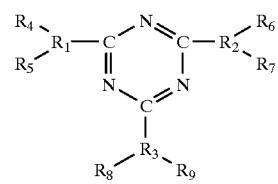

Formula A wherein at least one of $R_1$, $R_2$, or $R_3$ is nitrogen and the remaining R groups, $R_1$, $R_2$, or $R_3$, may be nitrogen, hydrogen, hydroxyl, alkyl (i.e. from 1 to 4 carbon atoms in the alkyl group), alkoxy (i.e. from 1 to 5 carbon atoms in the alkoxy group), or aryl; $R_4$, $R_5$, $R_6$, $R_7$, $R_8$, and $R_9$ may be hydrogen, alkyl (i.e. from 1 to 4 carbon atoms in the alkyl group), aryl, carboxyl, amide, methylol, higher order alcohols (i.e. from 1 to 5 carbon atoms in the alcohol group), or alkoxy (i.e. from 1 to 5 carbon atoms in the alkoxy group), and wherein at least one of these R groups is methylol or a higher order alcohol (i.e. from 1 to 5 carbon atoms in the alcohol group), and at least two of these R groups substituted on the same nitrogen, $R_1$, $R_2$, or $R_3$, are hydrogen (e.g. a primary amine functionality). Significant amounts of alkoxy substituents can retard the performance of the resulting benzoxazine polymer composition as a novolac curative. Another mode for preparing the benzoxazine polymer composition of this invention is to combine a phenolic compound, an aldehyde, and an alcoholate of an amino triazine whereby resole formation is in situ and the conditions are favorable for resultant benzoxazine formation. Yet another mode for preparing the benzoxazine polymer composition of this invention is to combine methylolmelamine, an aldehyde, and a resole, and allowing these to react under conditions favorable to the formation of benzoxazine.

The preferred mode for making the benzoxazine polymer composition of this invention comprises mixing and reacting a resole with a methylolmelamine and formaldehyde in aqueous solution. In all of these modes the starting amino triazine must have at least one primary amine, and the starting phenolic compound must have at least one —CH group in the ortho position on the phenolic ring. In each of these methods, some portion of the components can remain unreacted.

Resole Synthesis

The formation of a resole occurs under generally known conditions. The reaction is carried out at a molar ratio of phenolic compound to aldehyde of about 1:0.5 to about 1:2. The ratio of phenolic compound to aldehyde is selected so that there is at least one —CH group in the benzene ring ortho to the phenolic —OH group to allow later benzoxazine formation. Catalysts typically employed include sodium hydroxide, sodium carbonate, alkaline earth oxides and hydroxides, ammonia, HMTA and tertiary amines. Resoles may also form under neutral to mildly acidic conditions. Divalent metal salts, for example, will catalyze resole formation.

The phenolic compound used in the resole synthesis is preferably phenol itself but may be cresol, xylenols, alkyl substituted phenols, bisphenol A, bisphenol F, and mixtures thereof, so long as there is at least one unsubstituted carbon ortho to the phenolic hydroxyl group. The aldehyde used in the resole synthesis is preferably formaldehyde but may be another aldehyde such as acetaldehyde, propionaldehyde, n-butyraldehyde, isobutyraldehyde, benzaldehyde, glyoxal, and furfural.

A resole useable in the synthesis of the benzoxazine polymer composition may be prepared by reacting substituents, other than the phenolic and aldehyde compounds listed above, into the resole moiety. For example, the benzoxazine polymer composition may be synthesized using an alkoxy-modified-resole. U.S. Pat. No. 4,634,758, herein incorporated by reference in its entirety, discloses a process for manufacturing alkoxy-modified resoles. As another example, a resole modified with an aliphatic polyhydroxy compound is useable in the synthesis of the benzoxazine polymer composition. The aliphatic polyhydroxy compound is covalently bound into the resole. U.S. Pat. No. 5,189,079, herein incorporated by reference in its entirety, discloses a process for making resoles covalently bound with polyhydric alcohols.

A typical process for resole synthesis is described as follows. Reactants are introduced into a 1 liter four-necked round-bottom flask. The flask is fitted with means to stir the flask contents, means to monitor the temperature of the flask contents, and means to reflux volatile components and products. Reflux is afforded by use of a reflux condenser fitted to one opening of the four-necked flask. The condenser is typically cooled using water. Reactants are pre-weighed before addition to the four-necked flask. It is well known in the art that the weights of reactants are adjusted at the time of addition to account for differences between the nominal assay and the precise assay of the reactant. The flask contents are heated by an electric heating mantle that is controlled by a rheostat, or by use of a steam table, so that specific temperatures may be reached and maintained. Other arrangements will be known to those skilled in the art.

In a typical synthesis, the four-necked flask is first charged with phenol and sufficient sodium hydroxide typically in the form of a 50% aqueous solution. The flask contents are then heated to about 45° C. with mixing and under atmospheric reflux. The reflux condenser is attached to the flask throughout the resole synthesis. Next, 50% aqueous formaldehyde solution (formalin) is slowly added over a 60 minute period. During this addition the temperature of the contents is maintained at or below 60° C. The flask is cooled with ice, by use of a water jacket, or by vacuum reflux if necessary. Following the formalin addition, the flask contents are maintained at about 60° C., and allowed to react until the free formaldehyde (FF) is measured to be less than or equal to about 1.5% on a weight/weight basis (the free formaldehyde endpoint). Should the residual free formaldehyde plateau before the free formaldehyde endpoint is reached, then additional sodium hydroxide may be added to further advance the reaction of free formaldehyde. The free formaldehyde is conveniently determined by the standard hydroxylamine method. In this method, free formaldehyde in a sample solution is reacted with hydroxylamine hydrochloride at an initial pH of 4.0 for a period of 5 minutes. As the formaldehyde reacts, the pH of the sample decreases. At the end of the 5 minute period the sample is titrated back to a pH of 4.0 with aqueous sodium hydroxide. The free formaldehyde concentration is calculable from the amount of sodium hydroxide used. Other methods known in the art to be useful in determining free formaldehyde in resin solutions may be used.

Methylolmelamine Synthesis

Methylolmelamine may be purchased, synthesized in a separate step, or synthesized in situ in the preparation of the benzoxazine polymer composition. Methylolmelamine is the reaction product of formaldehyde and melamine under conditions generally known to be suitable for the formation of methylolmelamine. In a typical synthesis, formaldehyde, sodium hydroxide, and melamine are mixed and reacted. The methylolmelamine thus formed will be comprised of monomethylolmelamine, and higher order substitutions such as dimethylolmelamine and trimethylolmelamine. The methylolmelamine, regardless of its degree of substitution, is referred to herein simply as methylolmelamine for convenience.

Alternatively, methylolmelamine prepared by any other means or purchased as the manufactured chemical may be used in the preparation of the benzoxazine polymer composition. It is necessary, however, that the methylolmelamine contain at least one primary amine group.

In a typical methylolmelamine synthesis, reactants are introduced into a 1 liter four-necked round-bottom flask. The flask is fitted with means to stir the flask contents, means to monitor the temperature of the flask contents, and means to reflux volatile components and products. Reflux is afforded by use of a reflux condenser fitted to one opening of the four-necked flask. The condenser is typically cooled using water. Reactants are pre-weighed before addition to the four-necked flask. The flask contents are heated by an electric heating mantle that is controlled by a rheostat, or by use of steam table, so that specific temperatures may be reached and maintained. Other suitable arrangements may be known to those skilled in the art.

The four-necked flask is first charged with a nominal 50% formalin solution and a nominal 12.5% aqueous sodium hydroxide solution. These reactants are mixed, and then checked for pH. The pH of these mixed reactants should be from about 7.0 to about 10.0, and preferably from about 8.0 to about 9.0. If necessary, the pH is adjusted using either an acid, if it is necessary to lower the pH, or more of the 12.5% sodium hydroxide solution, if it is necessary to raise the pH. Suitable inorganic acids would be sulfuric acid or hydrochloric acid, however other acids, either inorganic or organic, may be used. It should be noted here that the sodium hydroxide solution may be used at about 25% or about 50% solution so long as the adjusted pH is within the range specified.

With the pH of the formalin plus sodium hydroxide solution within the required range, melamine is next rapidly charged to the four-necked flask. The amount of melamine added is from about 0.25 mole to about 1.0 mole per mole of formaldehyde used, and preferably from about 0.33 to about 0.40 mole per mole of formaldehyde used. The flask contents is then heated to about 75° C. and maintained at that temperature until essentially a clear solution is achieved. In practice the contents of the flask is heated to about 55° C. and allowed to exotherm to about 75° C. The formaldehyde, sodium hydroxide, and melamine are allowed to react under reflux until a clear solution is obtained. When the flask contents becomes a clear solution the flask is cooled to about 60° C. and is now ready for use in the synthesis of the benzoxazine polymer composition.

Synthesis of the Benzoxazine Polymer Composition

In a typical mode for synthesis of the benzoxazine polymer composition, a resole, an aldehyde, and an alcoholate of an amino triazine are mixed and reacted to produce the benzoxazine polymer composition. An aldehyde is added in an amount of at least 1.0 mole per mole-equivalent of primary amine present, and preferably from about 1.6 to about 3.8 moles. Too large an addition of aldehyde can result in excess aldehyde in the final composition that may result in release of an objectionable amount of the aldehyde during cure of a novolac or during thermosetting of the composition. Suitable aldehydes include formaldehyde, acetaldehyde, propionaldehyde, n-butyraldehyde, isobutyraldehyde, benzaldehyde, glyoxal, and furfural. Formaldehyde is the preferred aldehyde. Suitable alcoholates of amino triazines include methylolmelamine, methylolguanamine, methylated benzyl guanamine, and related compounds. Methylolmelamine is the preferred alcoholate. The resole is added in an amount of at least one equivalent of reactive phenolic compound for every two moles of aldehyde added. The reactive phenolic compound in the typical case is any resole phenolic compound that has at least one —CH group in the benzene ring ortho to the phenolic —OH group and an available hydroxy group on the benzene ring.

The combination of a resole, an alcoholate of an amino triazine, and an aldehyde is allowed to advance to an end point. The term "advance" used herein describes the change of composition that will occur over time as the components react. Any reaction temperature may be used so long as the process limitations and product limitations are met. The end point of the synthesis is said to occur when the time it takes the composition to gel at 150° C. lies within a specified range. The gel test employed is referred to as the "Stroke Cure Test," "Hot Plate Cure Test," or "HPC."

The HPC determines the amount of time required for an immovable film to form on a hot plate held at 150° C. In this test, about 1 gram of sample is placed on the hot plate which has previously been equilibrated to the test temperature of 150° C. A spatula is then used to spread the sample out over the hot plate, thus covering the hot plate in an approximately square pattern measuring about two inches by about two inches. The test ends when a film has formed on the hot plate. Film formation is judged to have occurred when the sample no longer spreads or moves under the motion of the spatula. The amount of time to film formation, measured from when the sample is first placed on the hot plate, is the HPC time. For the composition of this invention, an HPC time of about 20 to about 500 seconds is desired, with the preferred range from about 40 to about 120 seconds.

A preferred synthetic sequence is detailed as follows. A resole, methylolmelamine, and formaldehyde, mixed as aqueous solutions, are initially at a pH of 7.0 or above, and preferably from about 8.0 to about 9.0. Too high of a pH may result in homocondensation of the resole. If necessary, the pH is adjusted using either an acid, if it is necessary to lower the pH, or a base if it is necessary to raise the pH. Suitable inorganic acids would be sulfuric acid or hydrochloric acid, however other acids, either inorganic or organic, may be used. A suitable base is an aqueous solution of sodium hydroxide, although other bases, either organic or inorganic, may be used. After combining the resole, methylolmelamine and formaldehyde, the flask contents are heated to about 100° C. and allowed to react under atmospheric reflux until an HPC time of about 20 to about 500 seconds is reached. In practice, this may take anywhere from less than 10 to about 60 minutes measured from when the temperature of the flask contents reaches 100° C. However, practically, reaction temperatures in aqueous solution may range from about 50° C. to about 150° C. Once the specified HPC time is reached, water and volatile components are removed until a final desired HPC time is reached. The removal of water and other volatile components is purely optional, but their removal may cause a decrease in the HPC time.

Water and other volatile components may be removed by distillation, or spray drying, but other suitable methods will be known to those skilled in the art. However, water removal is not required. Once the final required HPC time is reached preparation of the benzoxazine polymer composition is complete.

Benzoxazine Polymer Composition Synthesis With In Situ Methylolmelamine Formation The benzoxazine polymer composition may be synthesized directly from a resole, an aldehyde, and melamine. The aldehyde comprises at least formaldehyde and possibly other aldehydes. Formaldehyde is required to synthesize the methylolmelamine. However, benzoxazine formation may be via formaldehyde or any other suitable aldehyde present. In the preferred synthesis from aqueous solution, the initial pH, intermediate free formaldehyde, intermediate HPC times, and final HPC times are all controlled to the same values given above for the synthesis of the benzoxazine polymer composition when methylolmelamine is a starting component.

Benzoxazine Polymer Composition Synthesis With In Situ Formation of All Reactants The benzoxazine polymer composition may be synthesized from a phenolic component, an amino triazine component, and an aldehyde. Conditions suitable for resole synthesis, as generally described above, must be used. Also, conditions suitable for the formation of an alcoholate of an amino triazine, such as described above for the case of in situ formation of methylolmelamine, must be used. Once the resole and alcoholate of an amino triazine are formed in situ they may react with eachother and residual aldehyde to produce the benzoxazine polymer composition of this invention. Accordingly, an aldehyde amount must be provided in the course of this synthesis such that once the resole and alcoholate of an amino triazine are formed there is an effective amount of free aldehyde present. This free aldehyde is referred to herein as the residual aldehyde. The residual aldehyde must be present in an amount of at least 1.0 mole per mole-equivalent of primary amine present, and 1.0 mole per each 0.5 mole of reactive phenolic group of the resole.

The process for making the composition of this invention is defined by the critical steps of the process. These steps comprise combining a resole, an alcoholate of an amino triazine, and an aldehyde, so that the aldehyde is present in an amount of at least 1.0 mole per mole-equivalent of primary amine present, and the resole is present in an amount of at least one equivalent of reactive phenolic group for every two moles of aldehyde added. This mixture is then advanced to an HPC time of about 20 to about 500 seconds. As those skilled in the art will recognize, the in situ formation of resole and alcoholate of an amino triazine may be accomplished without jeopardizing the critical steps of the process and will allow the resultant formation of the benzoxazine polymer composition of this invention.

It should be obvious to one skilled in the art that there are various subordinate steps that may be used, but which do not change the essence of this process. For example, temperature and pressure may be regulated during synthesis of the benzoxazine polymer composition allowing continuous distillation until the specified final HPC time is attained. Also the process may be operated within a range of temperatures. Reflux, when used, may be at a reduced or elevated pressure relative to atmospheric pressure. Other methods such as spray drying or vacuum dehydration may be used. It is also possible to remove no water and still produce the composition of this invention.

Novolac Preparation

Novolac resins are typically obtained by the reaction of a phenolic compound and an aldehyde in a strongly acidic pH region. Suitable acid catalysts include the strong mineral acids such as sulfuric acid, phosphoric acid and hydrochloric acid as well as organic acid catalysts such as oxalic acid, para-toluenesulfonic acid, and inorganic salts such as zinc acetate or zinc borate. The phenol is typically phenol itself, but can be cresol, xylenols, alkyl substituted phenols such as ethylphenol, propylphenol, and mixtures thereof. The aldehyde is typically formaldehyde, but other aldehydes such as acetaldehyde, propionaldehyde, n-butyraldehyde, isobutyraldehyde, benzaldehyde, glyoxal, and furfural can also be used.

Novolacs may also be synthesized at neutral to mildly acidic conditions. This may be accomplished, for example, with mildly acidic divalent metal catalysts. Typical catalysts employed include the calcium, magnesium or zinc salts of acetic acid.

The reaction of the aldehyde and phenol, in making a novolac, is carried out at a molar ratio of 1 mole of the phenol to about 0.30 to about 0.85 moles of aldehyde, with a preferred mole ratio of about 1:0.5 to about 1:0.8. For practical purposes, phenolic novolacs do not harden upon heating but remain soluble and fusible unless a curative is present. The molecular weight of the novolac will vary depending on the application. For practical purposes the novolac can be a liquid or a solid at room temperature. Also, the structure of the novolac will vary with the type of catalyst employed. Novolac reactions performed under strongly acidic conditions tend to produce resins with fewer ortho-ortho' methylene bridges as compared to novolac resins formed under neutral to slightly acidic conditions.

The benzoxazine polymer composition of this invention is universally applicable to all novolac resins. While typical novolac resin synthesis has been described, the effectiveness of the disclosed curative is not limited to these resins.

EXAMPLES OF MANUFACTURE OF BENZOXAZINE POLYMER COMPOSITIONS

Examples 1, 2, and 3

For each of the following examples, first, the resole was prepared in a separate synthesis. To a reaction flask, 2600.0 grams of liquid phenol and 33.8 grams of 50% sodium hydroxide solution are charged. The contents were maintained at about 46° C. Next, 1399.23 grams of 50.41% aqueous formaldehyde solution were slowly added over a period of 62 minutes. The combination of phenol, formalin, and sodium hydroxide solution was then held for 150 minutes, at which time the free formaldehyde was measured by the hydroxylamine method. The free formaldehyde was determined to be 3.1% (w/w). The flask contents were allowed to react another 45 minutes at 60° C. At the end of this period the free formaldehyde was determined to be 2.9% (w/w). A second addition of 13.5 grams of sodium hydroxide was made and the reaction allowed to proceed for another 90 minutes. At the end of this time the flask contents were cooled and reserved until needed for the synthesis of the benzoxazine polymer composition.

The resole of these examples was characterized by analytical methods well known in the art. The results of this characterization were a solids content of 47.03%, a free phenol content of 29.2%, a free formaldehyde content of 1.5%, and a water content of 16.4%. The remaining 5.87% can be accounted for by low molecular weight adducts that are not measured in the free phenol or free formaldehyde test, but are low enough in molecular weight to be lost during the determination of solids content. It should be obvious from the reaction conditions and the relative amounts of reactants and unreacted monomers that nearly all of the phenolic groups comprising the resole of these examples had at least one unreacted ortho position.

For the methylolmelamine synthesis of Example 1, reactants are introduced into a 1 liter four-necked round-bottom flask. The four-necked flask is first charged with 227.48 grams of 50.41% formalin solution and 0.81 grams of 12.5% aqueous sodium hydroxide solution. These reactants are mixed, and then checked for pH. The pH of these mixed reactants was 8.58. Next, 162.15 grams of melamine was rapidly charged to the four-necked flask. The flask contents was heated to about 55° C. and allowed to exotherm to about 75° C. After about 4 minutes at 75° C. the flask contents was essentially a clear solution. The flask was then cooled to about 60° C. in preparation for the resole and formalin addition.

In the synthesis of the benzoxazine polymer composition, resole and 50% formalin are added to the flask containing the methylolmelamine previously prepared. For the composition of Example 1, 157.0 grams of the previously prepared resole and 143.80 grams of 50.41% formalin were added to the four-necked flask containing the methylolmelamine. The flask contents were then heated to about 100° C. and allowed to react under atmospheric reflux until an HPC time of 76 seconds was reached. The time under atmospheric reflux at 100° C. was 60 minutes. The free formaldehyde of the flask contents at this point was measured at 1.3%. Next, water and volatile components were removed by vacuum distillation at a reduced pressure of from about 22 inches of mercury to about 27.5 inches of mercury. The vacuum distillation was continued until the second HPC time of 49 seconds was reached.

The composition of Examples 2 and 3 were prepared in a similar way as to that of Example 1. The further preparative steps for Examples 2 and 3, comprising methylolmelamine synthesis followed by addition of resole to then make the composition of this invention, is conveniently tabulated. Accordingly, the additions comprising the manufacture of the composition of Example 2 and Example 3 are given in tables 1 and 2. The formalin and sodium hydroxide additions are given in terms of the actual percent concentration of the component and the amount added. The additions for the composition of Example 1 are included to further clarify the tabulation.

TABLE 1

Examples 1, 2, and 3
Additions for Methylolmelamine Synthesis

|  | Formalin (%; grams) | Sodium Hydroxide (%; grams) | Melamine (grams) |
| --- | --- | --- | --- |
| Example 1 | 50.41; 227.48 | 12.5; 0.81 | 162.15 |
| Example 2 | 50.41; 197.41 | 25.0; 0.74 | 141.00 |
| Example 3 | 50.07; 197.70 | 12.5; 0.91 | 141.00 |

TABLE 2

Examples 1, 2, and 3
Additions for Synthesis of Benzoxazine Polymer Composition

|  | Resole (grams) | Formalin (%; grams) |
|---|---|---|
| Example 1 | 157.0 | 50.41; 143.80 |
| Example 2 | 157.0 | 50.41; 213.60 |
| Example 3 | 157.0 | 50.07; 179.75 |

The reaction conditions for these examples were maintained as described above. The reaction conditions for the above examples through the atmospheric reflux step are summarized in table 3.

TABLE 3

Examples 1, 2, and 3
Reaction Conditions During Methylolmelamine Synthesis

|  | First pH (pH units) | Time to Reach Clear Point at 75° C. (minutes) | Time Under Reflux at 100° C. (minutes) | HPC at End of 100° C. Period (seconds) | FF at End of 100° C. Period (% w/w) |
|---|---|---|---|---|---|
| Example 1 | 8.58 | 4 | 60 | 76 | 1.3 |
| Example 2 | 8.32 | 2 | 50 | 89 | 2.3 |
| Example 3 | 8.52 | 2 | 50 | 98 | 3.2 |

After the desired HPC time is reached under atmospheric reflux the flask contents are then subjected to vacuum distillation until the second desired HPC time is achieved, as described above. The final parameters for the compositions of Examples 2 and 3 are given in table 4. The values for the composition of Example 1 are included to further clarify the tabulation.

TABLE 4

Examples 1, 2, and 3
HPC Values

|  | HPC (seconds) |
|---|---|
| Example 1 | 49 |
| Example 2 | 62 |
| Example 3 | 71 |

Benzoxazine polymer compositions made according to this invention may be solid at room temperature. However, it is possible to control the water removal so as to produce essentially a liquid composition. The solids are white powders in appearance, although color is not a critical variable.

Example 4

Use of Commercially Available Methylolmelamine

As an example of the synthesis of the benzoxazine polymer composition using an alternative to synthesis of the amine, Example 4 was conducted to show the feasibility of synthesizing the composition using a commercially available methylolmelamine. CASCOMEL MF-600, a product of Borden Chemical, Inc., Louisville, Ky., was used as the primary amine. In this step, 157 grams of the same resole used in Examples 1 through 3 was combined with 125 grams of water and 200 grams of CASCOMEL MF-600 in a four-necked flask equipped as previously described. The flask contents were heated to 60° C. under mixing. The pH at this point was measured to be 8.6. Next, 212.9 grams of 50.41% formalin was added to the flask contents. This mixture was then heated to 100° C. and allowed to reflux, under atmospheric pressure, for 48 minutes. At the end of the reflux step the HPC was measured at 90 seconds and free formaldehyde was 4.5%. The flask contents were vacuum distilled to produce a final product having a solids content of 86.28%, an HPC of 62 seconds, and a free formaldehyde content of 2.2%.

Example 5

In Situ Methylolmelamine Synthesis

In this version of the synthesis of the benzoxazine polymer composition, 462.4 grams of 50% formalin and 0.59 grams of 25% sodium hydroxide solution were added to the reaction flask so that the pH after mixing was 8.59. Then, 157 grams of the resole of example 1 and 141 grams of melamine were added. Under mixing, the contents of the reaction flask were heated to 70° C. and allowed to exotherm to 80° C. The flask contents were clear when 80° C. was reached. When the temperature dropped to 79° C. further heating was used to bring the flask contents to 103.5° C. and atmospheric reflux was established. The flask contents were then allowed to react under atmospheric reflux until an HPC time of 83 seconds was reached. The time under atmospheric reflux was 54 minutes. The free formaldehyde of the flask contents at this point was measured at 9.2% by the hydroxylamine method. To further reduce the free formaldehyde, 40 grams of urea was added. Next, water and volatile components were removed by vacuum distillation at a reduced pressure of about 22 inches of mercury and a temperature of about 65° C. The vacuum distillation was continued until the second HPC time of 54 seconds was reached. The free formaldehyde at this point was 1.0 percent.

Characterization of Benzoxazine Polymer Compositions

The compositions of Examples 1 through 5 were subjected to further testing to better characterize them. These tests elucidate practical aspects of the performance properties of the compositions of this invention. Where it is useful to do so, comparisons are made to conventional curatives. In those instances where the curatives were blended with a novolac, the novolac was selected from commercial resins available from Borden Chemical, Inc., Louisville, Ky. These novolac resins are identified as BR579B, SD1731A, and SD333A.

Analytical Example 1

Results of Differential Scanning Calorimetry

Differential Scanning Calorimetry (DSC) is useful in determining the curing temperatures of novolac/curative mixtures. Curing temperatures were determined by sealed mode DSC on solid blends containing the novolac BR579B. The curatives were either the product of Example 3 or HMTA, as noted with the DSC data of Table 5. Where HMTA is the curative the example is referred to as "comparative example." The mixes for the DSC tests were made in a high speed miniblender using varying percentages of curative based on the weight of novolac. The percent curative used is also noted with the DSC data of Table 5. The DSC tests were run in hermetically sealed aluminum pans with a heating rate of 10° C. per minute up to 300° C. The differential scanning calorimeter used was Differential Scanning Calorimeter model 910s of TA Instruments/Du Pont. Indium was used to standardize the instrument and the software used was General V4.1C Du Pont 2000.

(TGA) is useful in that the amount of carbon yield, indicating in a relative way the extent of crosslinking, may be demonstrated. Thermogravimetric analyses were run under nitrogen at a heating rate of 20° C. per minute to 1000° C. The instrument used was a 2050 Thermogravimetric Analyzer manufactured by TA Instruments/DuPont. Table 6 shows TGA results for the cure of BR579B using concentrations of the composition of Example 3 at levels of 15 and 25% based on the weight of novolac resin. These results are compared to the TGA results for BR579B cured with 9% HMTA (comparative example 2) and 25% of CASCOMEL MF-600 (comparative example 3).

TABLE 5

Example 3 and Comparative Example 1
DSC Results - Exotherms With Various Novolac Resins

| Novolac; % Curative | First Exotherm Peak (° C.) | First Range (° C.) | First Exotherm Amount (Cal./g) | Second Exotherm Peak (° C.) | Second Range (° C.) | Second Exotherm Amount (Cal./g) |
| --- | --- | --- | --- | --- | --- | --- |
| BR579B; 9% HMTA | 152.27 | 125–175 | 9.64 | none | none | none |
| BR 579B; 15% Example 3 | 145.40 | 100–198 | 5.23 | 230.77 | 200–275 | 2.44 |
| BR579B; 25% Example 3 | 143.39 | 100–176 | 5.55 | 232.27 | 180–250 | 3.03 |
| SD1731A; 15% Example 3 | 155.76 | 100–190 | 9.55 | 230.85 | 195–270 | 5.48 |
| SD1731A; 25% Example 3 | 140.96 | 98–198 | 9.71 | 229.95 | 201–263 | 2.88 |
| SD333A; 15% Example 3 | 163.51 | 100–198 | 9.96 | 231.33 | 200–260 | 4.02 |
| SD333A; 25% Example 3 | 142.81 | 100–198 | 9.58 | 233.02 | 200–268 | 3.74 |

The DSC data illustrates that the onset of cure with the composition of this invention is comparable to that realized when HMTA is used. In fact, in all cases, the peak exotherm for the composition of Example 3 occurs at a lower temperature than is the case when HMTA is used. The second exotherms are the lesser minor component of the total exotherm, and are generally about one-third of the total exotherm value. Therefore, for the composition of this invention, the major part of the cure exotherm occurs below 200° C., as is the case when HMTA is used. This second exotherm is an advantage in the manufacture of certain products. The benzoxazine polymer composition can provide a precurable composition such that a post-forming step may be incorporated into the manufacturing process before a final cure is effected. In this way, fibers, for example, coated with a mixture of the benzoxazine polymer composition and a novolac resin could be partially cured at a first temperature so that the coated fibers could be more easily handled. The coated fibers then could be post-formed, that is formed after the partial cure, to the shape of the final product and finally cured at a second temperature. The second cure temperature would be higher than the first cure temperature.

Analytical Example 2

Results of Thermogravimetric Analysis

The composition of Example 3 was mixed with commercial novolac BR579B, and the cure was monitored using thermogravimetric analysis. Thermogravimetric analysis

TABLE 6

Example 3 and Comparative Examples 2 and 3
Carbon Yield During Thermogravimetric Analyses

| Curative, % | Carbon Yield (% of Initial Weight) |
| --- | --- |
| HMTA; 9 | 52 |
| MF-600; 25 | 47 |
| Example 3; 15 | 27 |
| Example 3; 25 | 55 |

The carbon yield when the composition of the invention is used can be comparable to that achieved when HMTA is the curative and superior to that achieved with the commercial curative CASCOMEL MF-600. In fact, the carbon yield of the benzoxazine polymer composition is more than 14% greater than that realized with CASCOMEL MF-600 when both curatives are used at the same amount. These results support the practical utility of the disclosed novolac curative.

EXAMPLES OF CURING NOVOLAC RESINS

Cure Example 1

Results of HPC Testing

The compositions of Examples 1 through 4 were used to cure a commercial novolac, BR579B. BR579B is a solid at room temperature and, furthermore, it is a powder. The curatives, also solids at room temperature, are blended with the novolac using any means suitable for blending powders. The curatives of the examples were added at concentrations of 9, 12 and 15% based on novolac resin and compared to HMTA at 9% (comparative example 4). The HMTA is a commercial product, available from Borden Chemical, Inc., Fayetteville, N.C. These results are given in table 7 below.

TABLE 7

Examples 1 through 3 and Comparative Example 4
HPC Results - Cure Speed As A Function of Curative Amount

|  | HPC at 9% Curative Addition (seconds) | HPC at 12% Curative Addition (seconds) | HPC at 15% Curative Addition (seconds) |
| --- | --- | --- | --- |
| Example 1 | 305 | 120 | 71 |
| Example 2 | 208 | 99 | 72 |
| Example 3 | 270 | 92 | 69 |
| Example 4 | 160 | 92 | 68 |
| Comparative Example 4 | 95 | | |

Further examples of the rate of cure were determined for other novolac resins. In these examples HPC times for novolac SD-1731A and novolac SD-333A are compared to novolac BR579B. The rate of cure obtained using the composition of Example 3 is also compared to that found with HMTA as the curative. These results are presented in Table 8.

TABLE 8

Example 3 and Comparative Examples 5 through 7
HPC Results - Cure Speed As A Function of Curative Amount and Novolac Resin

|  | HPC at 9% Curative Addition (seconds) | HPC at 12% Curative Addition (seconds) | HPC at 15% Curative Addition (seconds) | HPC at 20% Curative Addition (seconds) | HPC at 25% Curative Addition (seconds) |
| --- | --- | --- | --- | --- | --- |
| Example 3; BR579B | | 115 | 86 | 56 | 40 |
| Example 3; SD-1731A | | | 315 | 197 | 136 |
| Example 3; SD-333A | | | 480 | 300 | 165 |
| HMTA; BR579B | 95 | | | | |
| HMTA; SD-1731A | 95 | | | | |
| HMTA; SD-333A | 111 | | | | |

The compositions of this invention generates HPC times similar to those realized when HMTA is the curative. This data shows that commercial cure speeds are attainable with the compositions of this invention.

Cure Example 2

Results of Flow Testing

Another comparative test that ranks the performance of a novolac curative is the Flow Test. In this test, the length of the flow path of a resin in the process of curing is measured.

Flow is measured as the distance curing resin travels, at a temperature of about 125° C., down an inclined glass slide held at 63° with respect to horizontal. For each comparison two separate measurements are made.

This test comprises the following steps. Curative and novolac resin are blended together using a Tekmar A-10 mill manufactured by Microanalytical, Incorporated. Approximately 0.5 grams of the blend, weighed on a analytical balance having 0.01 gram precision, is then pressed into pellets. Any means for making pellets known in the art is suitable. A pellet is placed on a glass slide measuring approximately 1×3×½ inches. The glass slide, holding the pellet sample, is placed in an oven equilibrated to 125±0.5° C. The glass slide is maintained in a horizontal position for three minutes, when it is then inclined to the test angle of 63° relative to horizontal. The slide and sample are held in this inclined position for 15 minutes. At the end of this period the slide is again placed in the horizontal, the slide is removed from the oven and allowed to cool, and the farthest extent of flow measured. For these tests the oven used is model "Blue M Power-O-Matic 60" manufactured by Blue M Electric Company, Blue Island, Ill.

For the flow test results given below, the curative of Example 3 was blended with commercial novolac BR579B, SD-1731A, and SD333A, as noted. A comparison was made to the measured flow when HMTA was used as the curative (comparative examples 8–10). The results of the Flow Test are given in Table 9.

TABLE 9

Example 3 and Comparative Examples 8 through 10
Flow Test Comparisons - Various Novolac Resin

| | Flow at 9% Curative Addition (mm) | Flow at 15% Curative Addition (mm) | Flow at 20% Curative Addition (mm) | Flow at 25% Curative Addition (mm) |
|---|---|---|---|---|
| BR-579B Novolac Resin | | | | |
| Example 3 | | 61 | 43 | 35 |
| Comparative Example 8 | 52 | | | |
| SD-1731A Novolac Resin | | | | |
| Example 3 | | >160 | 128 | 92 |
| Comparative Example 9 | 143 | | | |
| SD-333A Novolac Resin | | | | |
| Example 3 | | | | >160 |
| Comparative Example 10 | >160 | | | |

The curative possesses cure characteristics that are reasonably similar to the conventional curative HMTA. The data shows that both the flowability and cure rate of systems employing the compositions of this invention are reasonably similar to that realized when HMTA is used.

Cure Example 3

Results of Emissions Testing

Emission of ammonia occurring during the cure of a novolac was observed. During the cure of the novolac sample, emissions were collected and directed to a scrubbing reservoir containing water. That emissions were flowing into the scrubbing reservoir was evidenced by bubbles forming in the water. Completion of the cure was evidenced by a cessation of this bubbling. The reservoir then contained a scrubber solution comprising the water and any emission components dissolved in the water. This scrubber solution was tested for ammonia. The concentration of ammonia in the scrubber solution was measured using an ammonia specific electrode, model 95-12 manufactured by Orion Research Incorporated. The manufacturer's instructions were followed. As with the previous comparative tests, novolac BR579B was blended with the composition of Example 3 at varying concentrations. The results of emission testing are given in table 10.

TABLE 10

Example 3 and Comparative Example 11
Emissions During Cure

| | Ammonia (ppm) |
|---|---|
| 15% of Curative of Example 3 | 0.1187 |
| 20% of Curative of Example 3 | 0.0897 |
| 25% of Curative of Example 3 | 0.1011 |
| 9% of Curative HMTA | 15.57 |

The compositions of this invention reduce the emission of ammonia by two orders of magnitude relative to HMTA. It is important to note that deionized water yields an ammonia concentration measurement of 0.0897. This represents the error in the method. Therefore, the data shows that there was no ammonia emission when the benzoxazine polymer composition was used to cure a novolac resin. During these cure studies there was no detectable odor of ammonia when the curatives of this invention were used. However, there was a definite ammonia odor when HMTA was the curative.

Applications

The benzoxazine polymer composition disclosed herein can be universally applied to the cure of novolac binders. These applications include binding of refractory shapes, fiber bonding, felt bonding, use as a molding compound, binding of friction products such as brake pads, and the binding of foundry sands. Methods of applying and using conventional curatives can be used in the application of the curatives of this invention. The benzoxazine polymer composition may be liquid or it may be dehydrated, vacuum dried, or spray-dried to a solid form. Those skilled in the art will recognize that an effective amount of the composition of this invention can be mixed with dry or liquid novolacs to replace conventional curatives. An effective amount is the amount of curative required to yield the desired extent of cure.

The benzoxazine polymer composition can find use in many binding applications as a curative. In the manufacture of refractory shapes, these curatives can be mixed with a novolac resin and refractory aggregate. The binding of refractory aggregate is fully disclosed in U.S. Pat. No. 5,648,404 to Gerber, previously incorporated by reference in its entirety. For foundry shapes, these curatives can be mixed with a novolac resin and a foundry aggregate such as foundry sand. The binding of foundry aggregate is fully disclosed in U.S. Pat. No. 5,189,079 to Geoffrey, previously incorporated by reference in its entirety. In the manufacture of industrial laminates and impregnated paper, these curatives can be mixed with a novolac resin that binds industrial laminate materials such as laminate fabric, fiber, or paper. For insulating materials, these curatives can be mixed with a novolac that binds insulating materials such as insulating fibers, fiber mats, and insulating materials. These curatives can also be combined with a novolac to bind abrasive materials or friction materials to form abrasive products or friction products, respectively. The benzoxazine polymer composition can also be used to cure novolacs used in the bonding of textile felt materials. The processes of binding referenced by these applications are well known in the art and are more fully disclosed in *Phenolic Resins, Chemistry, Applications and Performance*, (A. Knop and L. A. Pilato, Springer-Verlag (1985).

The benzoxazine polymer composition offers an advantage in applications requiring a partial pre-cure before the final cure. In this way, fibers, for example, coated with a mixture of the benzoxazine polymer composition and a novolac resin could be partially cured at a first temperature so that the coated fibers could be more easily handled. The coated fibers then could be post-formed, that is formed after the partial cure, to the shape of the final product and finally cured at a second temperature. The second cure temperature would be higher than the first cure temperature.

It is also evident from the examples that the benzoxazine polymer composition is a thermosetting resin. The results of the HPC tests serve to demonstrate that this composition may be rendered into an intractable infusible mass by the application of heat. Those skilled in the art will recognize that this is the definition of a thermosetting resin. The benzoxazine polymer composition may therefore be applied where it is appropriate to use any other thermosetting resin.

In any of the applications of the benzoxazine polymer composition it is possible to blend this composition with conventional resin modifiers. These modifiers may include formaldehyde scavengers such as urea, resorcinol, and amino compounds. These modifiers may also include epoxies, bisphenols, vinsol, and organic plasticizers such as esters, phthalates, and glycols, and their derivatives. The use of modifiers with the benzoxazine polymer composition of this invention will be apparent to those skilled in the art.

Thus, it is apparent that there has been provided, in accordance with the present invention, a benzoxazine polymer composition, a process for manufacturing the composition, and curable novolac compositions, that fully satisfy the objects, aims and advantages set forth above. While the invention has been described with specific embodiments, it is evident that many alternatives, modifications and variations will be apparent to those skilled in the art in light of the foregoing description. Accordingly, it is intended to include all such alternatives, modifications and variations as set forth within the spirit and scope of the appended claims.

What is claimed is:

1. A benzoxazine polymer composition comprising the product of mixing and reacting in aqueous solution:
    a phenolic resole component having at least one —CH group in the benzene ring ortho to the phenolic —OH group per molecule;
    a methylolmelamine component having at least one primary amine; and
    an aldehyde;
        wherein the aldehyde amount is at least 1.0 mole per mole-equivalent of methylolmelamine present; wherein the resole amount is such that there is at least one equivalent of reactive phenolic group for every two moles of aldehyde added.

2. The composition of claim 1, wherein the mixture is initially at a pH of 7.0 or above.

3. The composition of claim 1, wherein the resole, methylolmelamine, and aldehyde are advanced to an HPC time of from about 20 seconds to about 500 seconds.

4. The composition of claim 1, wherein the aldehyde is added in amounts ranging from about 1.6 to about 3.8 moles for each mole-equivalent of methylolmelamine present in the mixture.

5. The composition of claim 4, wherein the aldehyde is formaldehyde.

6. The composition of claim 2, wherein the pH in the mixture is from about 8.0 to about 9.0.

7. The composition of claim 1, wherein the phenolic resole component is the reaction product of phenol and formaldehyde at a phenol to formaldehyde ratio of about 1.0:0.5 to about 1.0:2.0.

8. The composition of claim 1, wherein the methylolmelamine is monomethylolmelamine.

9. The composition of claim 1, wherein the methylolmelamine contains at least two methylol groups.

10. The composition of claim 1, wherein the methylolmelamine is the reaction product of formaldehyde and melamine at about 0.25 mole to about 1.0 mole per mole of formaldehyde in the presence of a catalytic amount of base material sufficient to maintain a pH when the components are first combined of from about 7.0 to about 10.0.

11. The composition of claim 10, wherein the melamine addition is from about 0.33 to about 0.40 mole per mole of formaldehyde added.

12. The composition of claim 10, wherein the pH is from about 8.0 to about 9.0.

13. The composition of claim 3, wherein the HPC time is 40 to 120 seconds.

14. A benzoxazine polymer composition comprising the product of mixing and reacting:
    a phenolic component having at least one —CH group ortho to the phenolic —OH group;
    an amino triazine component having at least one primary amine; and
    an aldehyde;
        wherein the phenolic component and the aldehyde component react to produce a resole component and in an amount such that there is at least one equivalent of reactive phenolic group for every two moles of aldehyde residual; wherein the amino triazine component and the aldehyde component react to produce an alcoholate of the amino triazine component; and wherein the residual aldehyde amount is at least 1.0 mole per mole-equivalent of primary amine present.

15. The benzoxazine polymer composition of claim 14 wherein the composition is advanced to an HPC time of from about 20 seconds to about 500 seconds.

16. A benzoxazine polymer composition comprising the product of mixing and reacting:
    a phenolic resole component having at least one —CH group in the benzene ring ortho to the phenolic —OH group per molecule;
    a methylolmelamine component having at least one primary amine; and
    an aldehyde;
        wherein the aldehyde amount is at least 1.0 mole per mole-equivalent of methylolmelamine present; wherein the resole amount is such that there is at least one equivalent of reactivephenolic group for every two moles of aldehyde added; and wherein the resole, methylolmelamine, and aldehyde are advanced to an HPC time of from 20 seconds to about 500 seconds.

17. A curable novolac composition comprising:
    a novolac resin; and
    an effective amount of the benzoxazine polymer composition of claim 1.

18. A means for curing a novolac resin comprising:
    (a) forming a mixture of the novolac and the compisition of claim 1; and
    (b) reacting the mixture.

19. A curable refactory shape composition comprising:

a novolac resin;

a refactory aggregate; and an effective amount of the composition of claim 1.

20. A curable foundry shape composition comprising:

a novolac resin;

a foundry aggregate; and and an effective amount of the composition of claim 1.

21. A curable industrial laminate composition comprising:

a novolac resin;

industrial laminate material; and an effective amount of the composition of claim 1.

22. A curable insulating material composition comprising:

a novolac resin;

insulating material; and an effective amount of the composition of claim 1.

23. A curable abrasive product composition comprising:

a novolac resin;

abrasive materials; and an effective amount of the composition of claim 1.

24. A curable friction product composition comprising:

a novolac resin;

friction materials; and an effectibe amount of the composition of claim 1.

25. A curable felt product composition comprising:

a novolac resin;

textile felt materials; and an effective amount of the composition of claim 1.

26. A means for providing a pre-curable novolac resin composition comprising;

(a) forming a mixture of the novolac and the benzoxazine polymer composition of claim 1; and (b) reacting the mixture to a partially cured state at a first temperature that is below a second temperature at which the mixture will react to a final cured state.

27. A means for providing a pre-curable novolac resin composition comprising;

(a) forming a mixture of the novolac and the benzoxazine polymer composition of claim 14; and (b) reacting the mixture to a partially cured state at a first temperature that is below a second temperature at which the mixture will react to a final cured state.

28. A means for providing a pre-curable novolac resin composition:

(a) forming a mixture of the novolac and the benzoxazine polymer composition of claim 16; and (b) reacting the mixture to a partially cured state at the first temperature that is below a second temperature at which the mixture will react to a final cured state.

* * * * *